May 31, 1966  R. R. SZATKOWSKI ETAL  3,253,696
FABRICATED CHANNEL SECTIONS FOR BELT CONVEYORS
Filed May 7, 1962  5 Sheets-Sheet 1

INVENTORS
RICHARD R. SZATKOWSKI
& RONALD A. SCHNURA
BY
Mason, Porter, Diller & Stewart
ATTORNEYS

INVENTORS
RICHARD R. SZATKOWSKI
& RONALD A. SCHNURA

BY Mason, Porter, Diller & Stewart
ATTORNEYS

May 31, 1966  R. R. SZATKOWSKI ETAL  3,253,696
FABRICATED CHANNEL SECTIONS FOR BELT CONVEYORS
Filed May 7, 1962  5 Sheets-Sheet 3

INVENTORS
RICHARD R. SZATKOWSKI
& RONALD A. SCHNURA
BY
Mason, Porter, Diller & Stewart
ATTORNEYS May 31, 1966  R. R. SZATKOWSKI ETAL  3,253,696
FABRICATED CHANNEL SECTIONS FOR BELT CONVEYORS
Filed May 7, 1962  5 Sheets-Sheet 4

INVENTORS
RICHARD R. SZATKOWSKI
& RONALD A. SCHNURA
BY
Mason, Porter, Diller & Stewart
ATTORNEYS United States Patent Office
3,253,696
Patented May 31, 1966

3,253,696
FABRICATED CHANNEL SECTIONS FOR
BELT CONVEYORS
Richard R. Szatkowski, Western Springs, and Ronald A. Schnura, Chicago, Ill., assignors to Continental Can Company, Inc., New York, N.Y., a corporation of New York
Filed May 7, 1962, Ser. No. 192,929
17 Claims. (Cl. 198—102)

This invention generally relates to conveyor systems and apparatus therefor, and more specifically to a conveyor system designed to convey articles about a corner.

In transferring articles from one portion of a conveying system to another portion which is located at right angles thereto, it is highly desirable to be able to accomplish such a transfer while maintaining the article at the same level. Such equal height transfer of articles about corners assures that the articles will be stably maintained in their desired position; nor will they be damaged by excessive jarring or tipped over in the case of can bodies and the like from a transfer from one height to another.

It is also desirable in such conveying systems to provide a means by which articles which are below a predetermined height, either by reason of their disposition on the conveyor or because of some inherent shortcoming of the articles per se, will not be conveyed about the corner of such systems but, instead, will be diverted therefrom for further processing or disposal.

Another highly desirable attribute of the conveying system is flexibility in its use, and to this end the invention provides structural sections which can be connected together so as to increase or decrease the length of portions of such a conveying system so as to render more flexibility to the system.

Another specific end to which the invention is directed is that of providing a housing upon which the moving portions of the conveying system may be supported. This support means should be strong, light weight, inexpensive and easily cleaned.

It is to the accomplishment of these above-mentioned features that the present invention is directed. It is, therefore, a primary object of this invention to provide a conveyor system having means for accomplishing all of the above-mentioned results.

An object of the invention is the provision of at least two article conveying belts, each of which has an upper and a lower flight, the upper flights of which are disposed at the same level, each belt further being disposed at right angles to each other and at least a portion of one belt underlying a portion of the upper flight of the other belt.

Another object of the invention is to provide a means for transferring articles travelling on a first pulley driving belt in a first direction to a second pulley driven belt disposed at right angles to the first belt while at all times maintaining the articles at a level equal to that of the first belt by partially disposing the second pulley so as to underlie a portion of the upper flight of the first belt.

A further object of the invention is to provide means for conveying articles about a corner, the means having a guide assembly mounted at the corner and including parallel spaced guide rails terminating at the corner and arcuate strap members connecting the termini of the guide rails for guiding articles about the corner.

Another object of the invention is to provide a system for conveying articles about a corner, the system having first and second conveyor belts disposed at right angles and a guide assembly located at the corner and adapted to guide articles which are above a predetermined height while travelling along the first belt from the first belt around the corner to the second belt while permitting articles which are less than this predetermined height to continue their travel along the first belt.

Still another object of the invention is to provide a support assembly particularly adapted for use in the hereinedescribed conveyor system and including a plurality of elongated channel shaped sections, two of which are disposed at right angles and each of the sections being adapted to connect with another like section so as to form a continuous conveying system of unlimited length in either direction from the corner formed by the right angular relationship of the two sections so disposed.

A still further object of the invention is to provide a channel shaped member for use in an article conveying system wherein endless belts are moved along and are supported by the channel shaped member which includes a base element with sides downwardly dependent therefrom, the base element being constructed of a honeycomb structure having layers of resin impregnated Fiberglas cloth on either side thereof, and the downwardly dependent sides being formed by extensions of the layers of resin impregnated Fiberglas cloth covering the base element.

With the above and other objects in view, as will appear hereinafter, the nature of the invention will be more clearly understood by reference to the following detailed description and the accompanying drawings.

Figure 1:
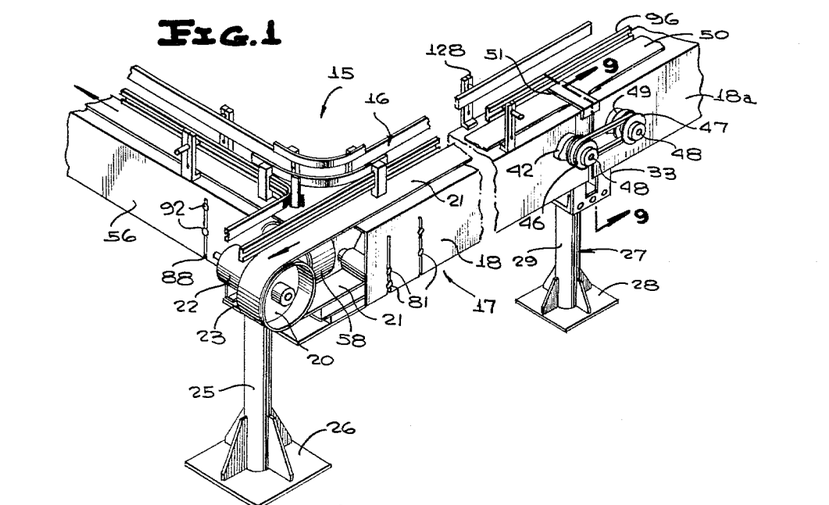
FIGURE 1 is a partial perspective view of the conveyor assembly and shows the interrelationship of the various structures constituting the system.
Figure 8:
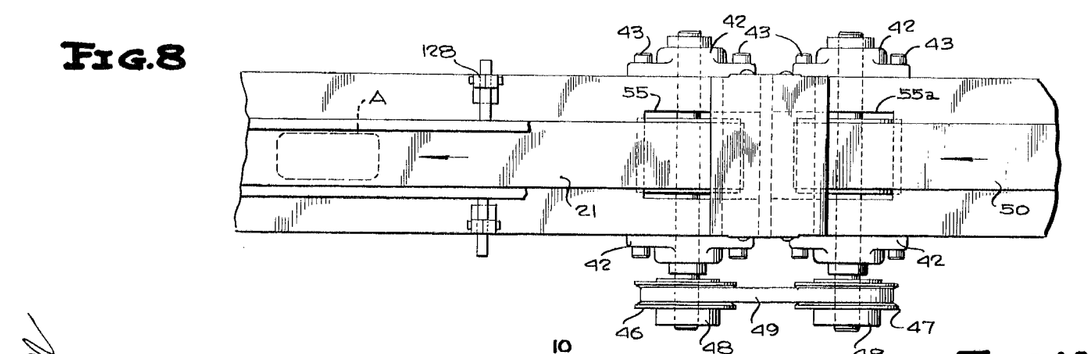
FIGURE 8 is a plan view on an enlarged scale of one portion of the conveyor assembly shown in FIGURE 1 and shows in particular the manner in which two conveyor sections are joined together.
Figure 9:
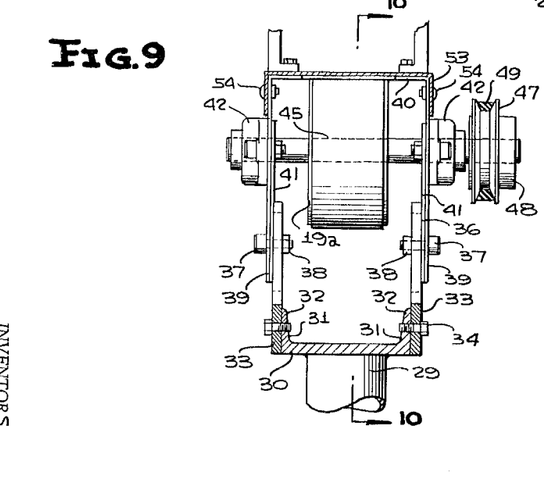
FIGURE 9 is a transverse vertical sectional view taken along the line 9—9 of FIGURE 1, and shows in particular the construction of one form of a channel-shaped supporting section.
Figure 10:
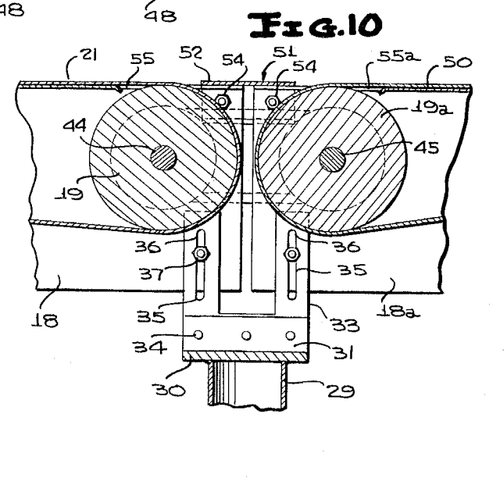
FIGURE 10 is a vertical sectional view taken along the line 10—10 of FIGURE 9.

Referring in detail to the drawings and more particularly to FIGURE 1 thereof, there is shown an over-all conveyor assembly 15 embodying the principles of the invention. The conveyor assembly 15 includes a guide assembly 16 and a support assembly 17 made up of individual channel-shaped support sections 18 and 56. Each of the support sections 18 and 56 is a complete unit in and of itself. The support section 18 is disposed in contiguous relationship to a corner formed by its right angle disposition with support section 56, as is best shown by FIGURE 1, and is provided with an idler pulley 19, as is best shown in FIGURE 10. The support section 18 also is provided with a driving pulley 20 and a belt 21 of the endless type is engaged over the pulleys 19 and 20. A driving means (not shown) provides motive force to the system 15 through its rotation of a stub shaft SS which projects from a right angle gear box 22 suitably secured to a platform 23. The platform 23 is, in turn, supported by a standard 25 which rests upon a conventional base 26.

Where two channel-shaped support sections 18, 18a are joined together to form an extended belt section, as is shown in FIGURE 1, there are provided suitable support means 27 for holding the support sections 18, 18a in contiguous relationship to each other. The support means 27 include a suitable base 28 and standard 29 similar to the base 26 and standard 25 of the platform 23. As is best shown in FIGURES 8 through 10 of the drawings, the standard 29 is provided at its upper end with a member 30 which is welded thereto and has upstanding leg portions. Each leg portion 31 is further provided with aligned bores 32. An upstanding plate member 33 is secured to each leg portion 31 of member 30 by means of bolts 34. The plates 33 are generally of a U-shaped outline, as is best shown in FIGURE 10, and are further provided at each side thereof with an elongated slot 35. The slots 35 are adapted for alignment with slot 36 formed within the sides of the channel-shaped support sections 18 and 18a. Bolts 37 pass through the thus aligned slots 35 and 36 and by means of nuts 38 connect the plates 33 to the sides of the channel-shaped support sections 18, 18a. The dependent sides of support sections 18, 18a include downwardly extending flanges 39 of a U-shaped member 40 and a brace plate 41 which gives added support to the bearing structures, as will hereinafter be explained. Suitable bearing supports 42 are secured to the flanges 39 and the support plates 41 by suitable nut and bolt assemblies 43. Shafts 44, 45 are supported for rotation within the bearing housings 42 and shaft 44 carries the idler pulleys 19 for rotation therewith while the shaft 45 carries an idler pulley 19a which is constructed similar to the pulley 19, the pulley 19a being associated with the support section 18a, as is best shown in FIGURE 10.

The shafts 44, 45 are provided at one end thereof with an extension upon which pulleys 46 and 47, respectively, are secured by means of retainers 48. A belt 49 is entrained over the pulleys 46, 47 and thereby enables rotary movement imparted to the rear idler pulley 19 of first support section 18 to be transmitted to the adjacent pulley 19a of the second support section 18a so as to impart the same directional movement to a belt 50 which is entrained over idler pulley 19a as is shown by the arrows of FIGURE 8.

In order to provide a smooth transition for articles travelling along the support section 18a onto the support section 18, as is shown by the right to left movement in FIGURE 8 of the drawings, there is a U-shaped transition plate 51 having a base 52 which extends across the width of each support sections 18, 18a at their point of contiguity, and downwardly extending flanges 53 in contact with the sides of the flanges 39 of the U-shaped member 40. Suitable nut and bolt type fasteners 54 secure the U-shaped transition plate 51 to the respective sides of the support sections 18 and 18a. It should be also noted that the top of the support sections 18 and 18a in the vicinity of the pulleys 19 and 19a have portions removed so as to form cutouts 55 and 55a, respectively. In this manner, articles traveling along the belt 50 will slide along the transition plate 51 and onto the belt 21 and thereby complete their travel from section 18a to the downstream contiguous section 18. It further should be noted that the base 52 of the transition plate 51 may be provided with beveled sides so as to make the transition smoother for articles passing from one support section to another, and likewise the base portions of the support sections 18 and 18a defining the cutouts 55 and 55a may be depressed slightly so as to place the transition plate 51 at a slightly lower position than either belt 50 or belt 21.

*Corner belt assembly and drive mechanism*

Figure 2:
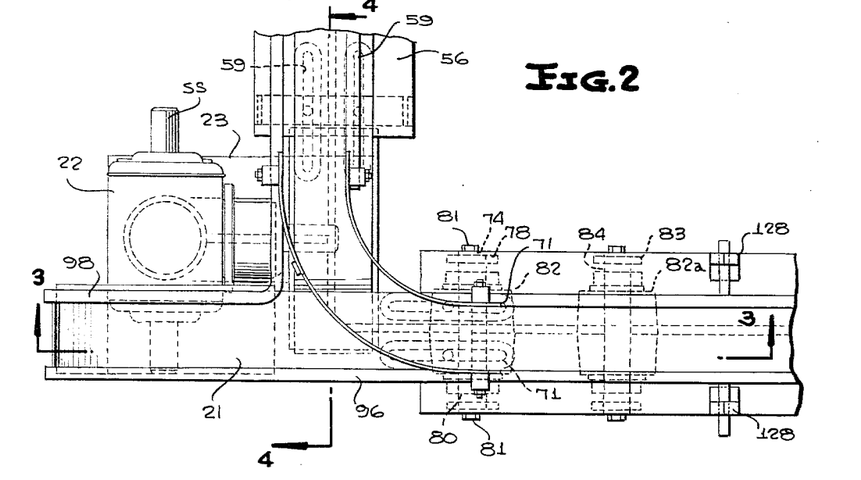
FIGURE 2 is a plan view of the assembly as shown in FIGURE 1.

The structural details of the corner assembly and drive mechanism are best described by reference to FIGURES 2 through 4 of the drawings. The platform 23, which is attached to the upper end of the standard 25, forms the support means for the entire corner assembly. The support section 56 is disposed at right angles to the support section 18. The support section 56 is further provided with a drive pulley 57 over which a belt 58 is entrained. The belt 58 is also entrained over an idler pulley (not shown) similar to pulley 19. The right angle gear box 22 supplies the motive force through stub shaft SS for the belts 21 and 58, respectively, as is shown by the arrows on each of the belts in FIGURE 1.

The portion of the platform 23 underlying the corner terminus of the support section 56 is provided with spaced elongated slots 59. An upstanding U-shaped member 60 having a base 61 is provided with holes 61' therein formed so as to align with the elongated slots 59. Fasteners 62 pass through the aligned slots and holes to adjustably secure the support section 56 to the platform 23. The U-shaped member 60 also has upstanding leg 63 having holes 64 formed therein. An inverted U-shaped member 65 having a web 66 and downwardly extending legs 67 supports the channel-shaped support section 56 near its corner terminus. The downwardly extending legs 67 are further provided with holes 68 which are aligned with suitably formed holes 70 within the lower portion of the channel-shaped support section 56, and bolts 69 pass through the aligned holes 64, 68 and 70 to secure the support section 56 and the U-shaped member 65 to the U-shaped member 60. A similar supporting arrangement is provided for the support section 18 by means of elongated slots 71 formed within the platform 23 beneath the corner terminus of the support section 18. An upright U-shaped member 72, similar to the member 60, and a U-shaped member 73, similar to the U-shaped member 65 are secured to each other and to the platform 23 and the support section 18, respectively. In this manner the members 60 and 65 and the members 72 and 73 thus comprise the mounting means for the support sections 18 and 56 in the vicinity of their corner termini.

Figure 3:
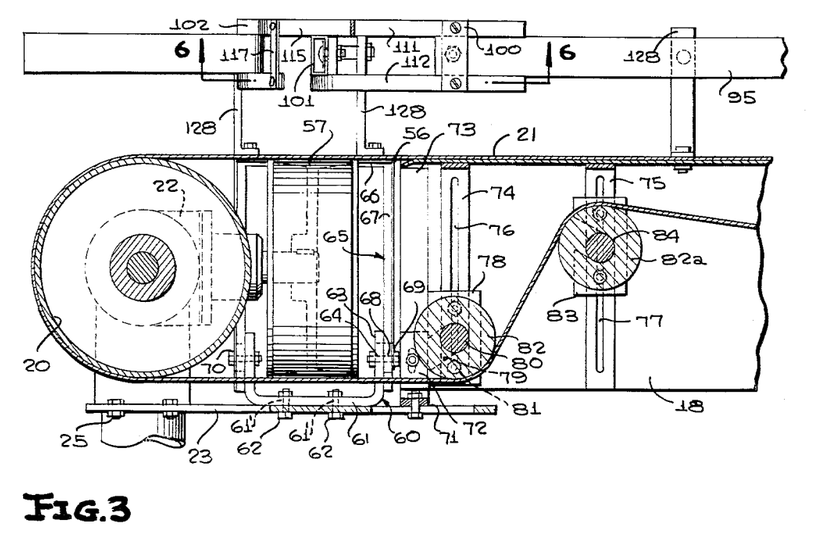
FIGURE 3 is a longitudinal vertical sectional view taken along the line 3—3 of FIGURE 2, and shows in detail one portion of the conveyor assembly.
Figure 4:
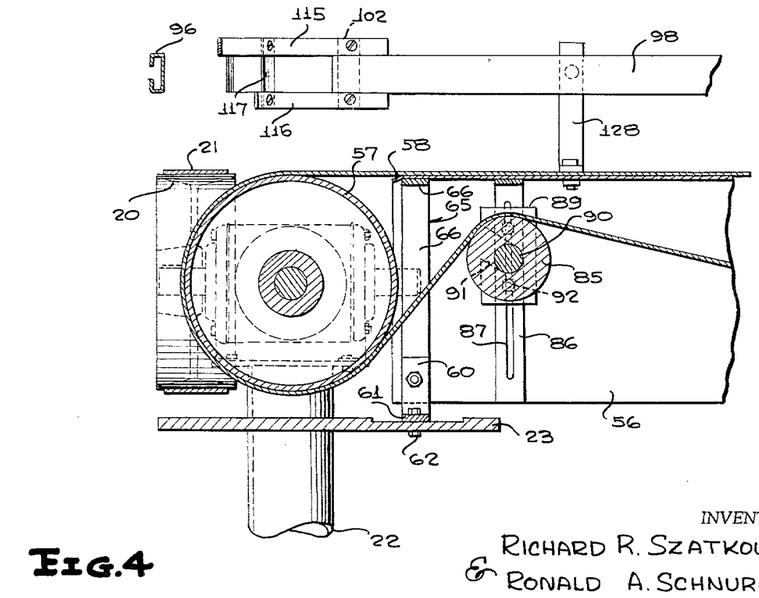
FIGURE 4 is a longitudinal vertical sectional view of another portion of the conveyor assembly taken along the line 4—4 of FIGURE 2.

Referring in particular to FIGURE 3 of the drawings, it will be seen that support section 18 is further provided with inner inverted U-shaped supports 74 and 75, respectively. The support members 74 and 75 are also respectively provided with slots 76 and 77 which are aligned with slots formed on either side of the support section 18. The support member 74 is further provided with a bearing plate 78 on either side thereof in contiguous relationship to the side walls of the section 18. Each bearing plate 78 is provided with an upwardly disposed slot 79 in which ends of a shaft 80 are supported. The shaft 80 is held in fixed position by suitable bolts 81 which serve to position the bearing plates 74 along the elongated slot 76. An idler roller 82 is rotatable about the shaft 80 and serves to retain that portion of the belt 21 intermediate the pulley 20 and the idler roller 82 in an essentially horizontal position so as to permit the driven pulley 57 associated with channel-shaped support section 56 to partially overlie the lower flight of the belt 21 and partially underlie the upper flight of the belt 21.

The second inverted U-shaped support member 75, which is disposed intermediate the idler roller 80 and the idler pulley 19, serves to support a tension roller 82a, mounted upon slotted bearing plates 83 in a similar fashion as the idler roller 82. Tension roller 82a rotates about a shaft 84 which is fixed but is slidable to varying positions along the slot 77 and thus serves to tension the belt 21 to the desired degree of tautness.

A similar tension roller 85 is mounted within the channel section 56 near its corner terminus. The means for mounting the tension roller 85 is similar to the means for mounting the tension roller 82a. To this end, an inverted U-shaped support member 86 having elongated slots 87 formed in the opposite sides thereof is attached to the sides of the support section 56 which, in turn, is provided with elongated slots 88 in the opposite sides thereof in alignment with the elongated slots 87. Bearing plates 89 are provided on opposite sides of the support member 86 and are designed to receive shaft 90 within slots 91 therein provided for the shaft 90. Appropriate fastening means, such as bolts 92, secure the above-described support structure to the sides of the support section 56.

The relationship between the pulleys 20 and 57 is best shown in FIGURE 3, where it is clear that portions of the driven pulley 57 underlie the top flight of the belt 21 which is in engagement with the pulley 20. The advantage of such an arrangement is that it provides for an equal level transition of articles passing from belt 21 to belt 58. The larger the extent to which the pulley 57 underlies the belt 21, up to slightly less than one half the diameter of pulley 57, the smoother the transition of articles passing from one belt to the other will be. There is, of course, a point at which the pulley 57 will interfere with the operation of the pulley 20, and it is thus contemplated that the extent to which the pulley 57 underlies the belt 21 will be short of this distance. It is further desirable to utilize a right angle gear box which has a one-to-one ratio which will thereby impart identical speeds to both of the belts 21 and 58, the driving pulleys 20 and 57, respectively, thereof being of the same diameter.

*Guide assembly*

Figure 6:
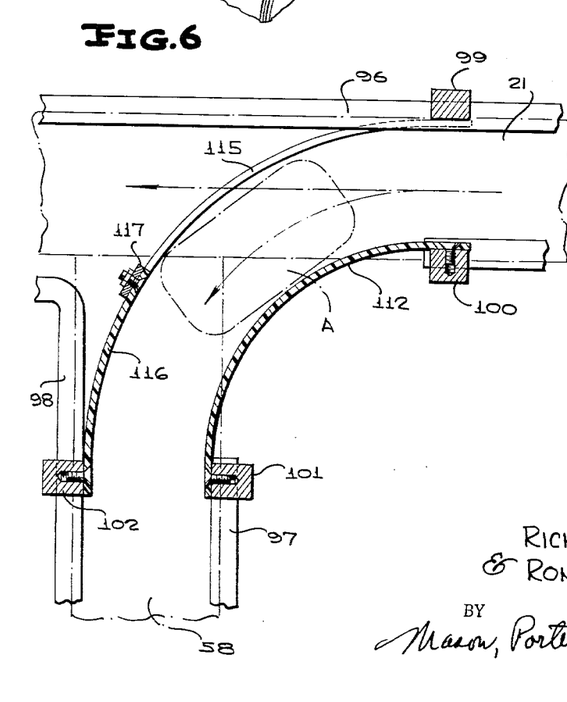
FIGURE 6 is a horizontal sectional view taken along the line 6—6 of FIGURE 3 and shows in detail the movement of an article around the corner of the conveyor assembly.
Figure 7:
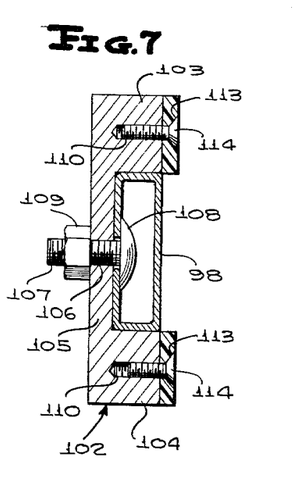
FIGURE 7 is a fragmentary vertical sectional view taken taken along the line 7—7 of FIGURE 5 and shows in detail the structure of the C-shaped corner strap supporting member.

The construction of the guide assembly 16 as shown in FIGURE 1 of the drawings will be described in reference to FIGURES 5 through 7. As is most clearly shown in FIGURE 5, an inner rail 95 and an outer rail 96 are secured in a position above and to either side of the belt 21. Their disposition above the belt 21 is at a convenient height so as to retain articles upon the belt whether such articles are upstanding as referred to by A or in a tipped over or fallen position as indicated at B. Similar channel retainers 97 and 98 are provided along the extent of belt 58 and are located on the inner and outer sides, respectively, thereof. The channel members 95, 96, 97 and 98 terminate short of the transfer corner with the exception that member 96 may be extended and member 98 may be provided with a right angle extension so as to continue the retention of articles B upon the belt 21.

Figure 5:
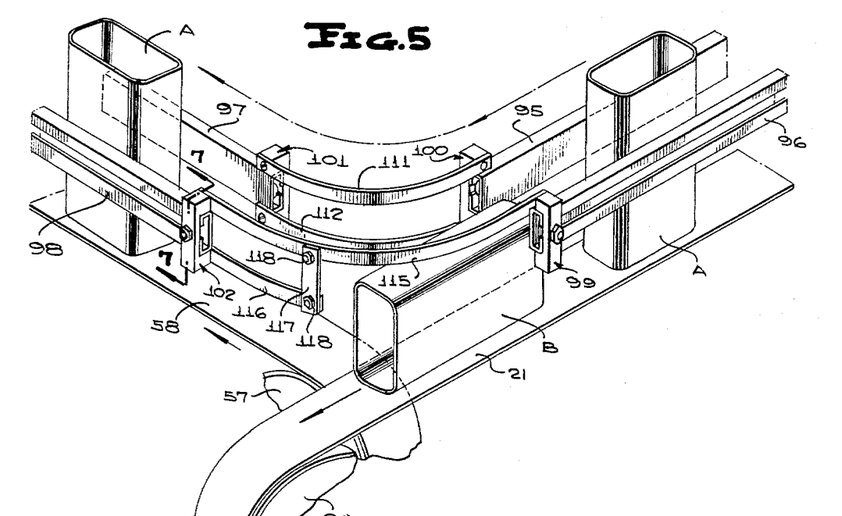
FIGURE 5 is a fragmentary perspective view similar to FIGURE 1 but on a larger scale with parts removed and being somewhat diagrammatic in character for purposes of clarity.

The corner termini of these channel guides are provided with C-shaped clamps 99, 100, 101, and 102 reading from the right to left on FIGURE 5 of the drawings. As is best shown in FIGURE 7, each C-shaped clamp is provided with an upper enlarged portion 103 and a lower enlarged portion 104 which are connected together by an upstanding connecting portion 105 having centrally disposed bore 106 therethrough. The extent of the connecting portion 105 and therefore the spaced distance between the upper and lower enlarged portions 103 and 104, respectively, is equal to the height of the channel guide members 95, 96, 97 and 98.

A bolt 107 having an enlarged head 108 and a cooperating nut 109 are used to secure each of the C-shaped clamps 99, 100, 101 and 102 to guide channels 95, 96, 97 and 98. Both the upper and the lower enlarged portions of each of the C-shaped clamps are provided with threaded bores 110. Upper and lower intermediate strap members 111 and 112, respectively, extend between and are secured to the C-shaped clamps 100 and 101 and thus form an inner corner guide means for upstanding articles A. The end of each intermediate strap member is provided with a hole 113 through which a conventional chamfer head screw 114 passes and which screw is threaded into the respective bore 110 so as to securely fix each intermediate strap member to its respective C-shaped clamp. The outer corner termini C-shaped clamps 99 and 102 are connected together by an intermediate upper elongated strap member 115 and a lower strap member 116 which extends only partially across the open outer corner. The strap members 115 and 116 are secured to their respective C-shaped clamps in a manner similar to the straps 111 and 112 and are also provided with holes 113 through which other conventional chamfer headed screws 114 pass and are engaged in the respective threaded bores 110 so as to securely fix them to the appropriate C-shaped clamps.

The height disposition of the outer corner strap member 115 is such that articles B disposed on their sides will pass therebeneath and thus will not be guided around the corner. In this manner, then, articles B disposed as shown in FIGURE 5 pass under the upper intermediate strap member 115, along the belt 21 and into an appropriate receptacle (not shown) for either disposal or return to the far end of the conveyor system leg actuated by drive pulley 20. The partial outer lower strap member 116 extends only part way across the outer corner at the juncture of the belts so as to further assure the guidance of upstanding articles A about the corner. The strap members 116 and 115 are connected together by a link 117 secured thereto by means of appropriate bolt and nut assemblies 118. The strap members 111, 112, 115 and 116 are preferably formed of self-cleaning polymeric materials such as the polyamides (nylon). As the strap members are inherently flexible and scuff free, they tend not to mark the articles A as they travel about the corner.

*Alternate support assembly*

Figure 11:
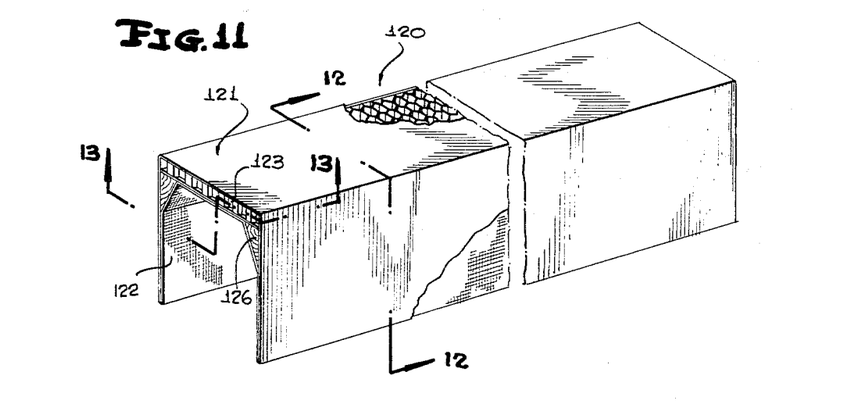
FIGURE 11 is a perspective view of the preferred form of channel-shaped sectional support with portions cut away for purposes of clarity.
Figure 12:
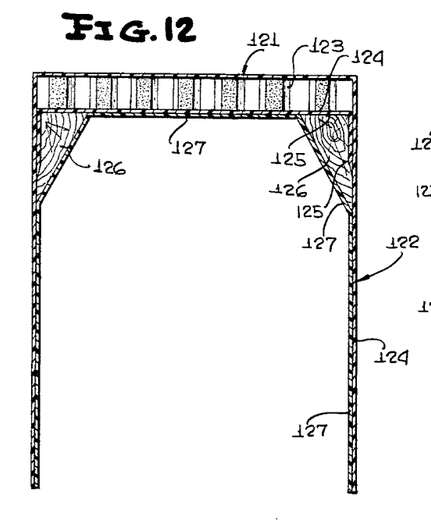
FIGURE 12 is a transverse vertical sectional view taken along the line 12—12 of FIGURE 11 and shows in particular the details of the preferred form channel-shaped support section.
Figure 13:
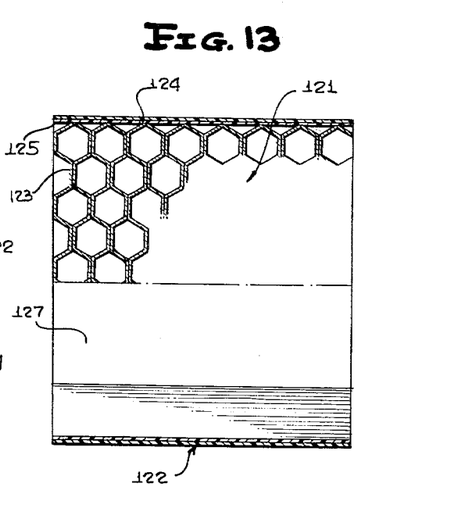
FIGURE 13 is a fragmentary transverse horizontal sectional view taken along the line 13—13 of FIGURE 11 and shows the specific honeycomb structure of the base portion of the channel-shaped support section.

The use of sheet metal plate in the construction of the channel-shaped support sections 18, as shown in FIGURE 1, is expensive and in many cases thin sheet metal is utilized as a substitute therefor. However, thin sheet metal does not have the inherent strength and rigidity often necessitated by the heavy use to which a conveyor system of this type is put. To this end, an advantageous construction material for the channel-shaped support sections is resin impregnated Fiberglas enclosing or surrounding a honeycomb base, as is shown in FIGURES 11, 12 and 13 of the drawings. A channel-shaped support section 120, as is shown in FIGURE 11, is comprised of a base section 121 having downwardly depending flanges 122. The base section 121 consists of a flat sheet of honeycomb preferably formed of resin impregnated paper. A first laminate 124 of layers of resin impregnated Fiberglas cloth is then applied over the top surface of the honeycomb 123 and shaped to extend downwardly to partially form the flanges 122. It is preferable, however, not completely necessary, that the resin utilized in impregnating the layers of Fiberglas cloth be the same or compatible with the resin utilized to impregnate the paper material making up the honeycomb 123.

A second laminate 125 of layers of resin impregnated Fiberglas cloth are then laid in intimate contact with the bottom of the honeycomb 123 and this second laminate 125 also extends downwardly from the edges of the honeycomb 123 so as to partially form the flanges 122. As further support for the section 120, a wooden elongated triangular-shaped strip 126 is placed on each side of the base 121 in contiguous relationship with the base and the proximal portions of the flanges 22 depending therefrom.

A tight interlock is formed between the laminates 124 and 125 as the impregnating resin and the glass fibers of each intermingle and form what essentially becomes a solitary layer in those portions of the laminates 124 and 125 that are in intimate contact with each other. To assure the retention of the wooden supporting strips 126, a third laminate 127 of layers of resin impregnated glass fiber is interlocked with the central portion of the laminate 125, and extends across the inwardly disposed surfaces of the wooden strips 126 and downwardly into contact with the laminate 124 so as to enlarge, strengthen, and complete the flanges 122.

The resulting structure presents a light weight, easily constructed and extremely inexpensive channe-shaped support section from which all the necessary equipment pertinent to conveyor assemblies of the type previously described may be supported. Therefore, this support section 120 supports all the necessary bearings, pulleys, electrical conduit, service piping, line controls and, if desired, the guide rail supports 128, as are shown in FIGURES 1, 3 and 8 of the drawings. This form of channel-shaped support section 120 serves, as in the case of conventional support sections, as the bed upon which the conveyor belt slides and also forms a protective guard for the return or lower flight of the conveyor belt. It is also believed obvious that this desirable structural form of support section may be designed as shown in FIGURES 8 through 10 of the drawings so as to be connectible to like units and thus form conveyor systems having legs of expandable and therefore unlimited length.

It is obvious that the exact structural details of the hereindescribed conveyor system are not restrictive, and that the invention may be practiced in other ways within the scope of the appended claims.

What is claimed as new is:

1. A system for conveying articles traveling in a first direction from said first direction to a second direction located in angular relation to said first direction while maintaining said articles at a predetermined level throughout said change of direction comprising a first endless belt adapted to support and convey said articles in said first direction, a second endless belt adapted to support and convey said articles in said second direction, said first and second belts being substantially at right angles to each other, a first pulley about which said first belt is in frictional contact, said first pulley separating said first belt into an upper flight and a lower flight, a second pulley about which said second belt is in frictional contact, said second pulley separating said second belt into an upper and a lower flight, at least portions of said second pulley underlying the upper flight of said first belt, said upper flights having upper surfaces disposed in an identical horizontal plane, a gap at the juncture of the first and second belts, said juncture being devoid of auxiliary transfer means between said upper flights whereby articles are transferred directly between said flights, and means for driving said first and second pulleys.

2. A system for conveying articles about a corner comprising first and second endless belts having adjacent ends disposed in close proximity and in angular relation to each other, each belt having an upper flight and a lower flight, a support assembly having sections disposed in angular relation, each section being of a generally inverted U-shaped configuration including a base and depending sides, each base being a honeycomb structure having a laminated upper exterior base surface, the upper flight of each belt being in contact with and supported by an associated one of said laminated upper exterior base surfaces, a guide assembly mounted above said support assembly bases, the upper flights of said belts being disposed at the same level, a drive pulley engaged with each belt, said drive pulleys being journalled in the depending sides of said sections, the drive pulley of the second belt partially underlying the upper flight of said first belt, and means for driving said drive pulleys whereby articles traveling in a first direction on said first belt are diverted by said guide assembly to said second belt whereupon said articles assume a second direction of travel at an angle to said first direction of travel.

3. A system for conveying articles about a corner comprising first and second endless belts having adjacent ends disposed in close proximity and substantially at right angles to each other, each belt having an upper flight and a lower flight, a support assembly having sections disposed at right angles, each section being of a generally inverted U-shaped configuration including a base and depending sides, each base being a honeycomb structure having a laminated upper exterior base surface, the upper flight of each belt being in contact with and supported by an associated one of said laminated upper exterior base surfaces, a guide assembly mounted above said support assembly bases, the upper flights of said belts being disposed at the same level, a drive pulley and an idler pulley engaged with said pulleys being supportingly journalled in the depending sides of said sections, each belt, each idler pulley being supported by a different section of said support assembly, the drive pulley of the second belt partially underlying the upper flight of said first belt, and means for driving said drive pulleys whereby articles traveling in a first direction on said first belt are diverted by said guide assembly to said second belt whereupon said articles assume a second direction of travel at right angles to said first direction of travel.

4. A system for conveying articles around a corner comprising first and second endless belts having ends disposed in close proximity and substantially at right angles to each other to define a corner, each belt having an upper flight and a lower flight, a support assembly, said upper flights of said first and second belts being adapted to support and convey articles, a guide assembly including spaced parallel guide rails disposed on both sides of and above said first and second belts for maintaining the position of articles on said belts, said rails terminating at said corner, an arcuate intermediate rail connected to the outer corner termini of one set of guide rails, and said arcuate rail being disposed above said belts a predetermined height, the drive pulley of the second belt partially underlying the upper flight of said first belt, said upper flights having upper surfaces disposed in an identical horizontal plane, a gap at each corner formed by the first and second belts, said corner being devoid of auxiliary transfer means between said upper flights whereby articles are transferred directly between said flights across said gap, and means for driving said drive pulleys whereby articles traveling in a first direction on said first belt are diverted by said guide assembly to said second belt whereupon the articles assume a second direction of travel at right angles to said first direction of travel so that articles of a height greater than said predetermined height will be diverted around the corner while articles less than said predetermined height will continue their travel upon said first belt.

5. The apparatus of claim 4 wherein said arcuate rail is attached to C-clamps which are in turn attached to termini of respective ones of said parallel rails.

6. The apparatus of claim 4 wherein said arcuate rail is formed from a self-cleaning polymeric material.

7. A system for conveying articles around a corner comprising first and second endless belts having adjacent ends disposed in close proximity and substantially at right angles to each other to define a corner, each belt having an upper flight and a lower flight, a support assembly, said support assembly having sections disposed in angular relationship, each section being of a generally inverted U-shaped configuration including a base and depending sides, each base being a honeycomb structure having a laminated upper exterior base surface, the upper flights of first and second belts being adapted to support and convey articles, the upper flights of each belt being in contact with and supported by an associated one of said laminated upper exterior base surfaces, a guide assembly including spaced parallel rails disposed on both sides of and above said first and second belts for maintaining the position of articles on said belts, said rails terminating short of said corner, a pair of spaced arcuate inner rails disposed intermediate of and connected to the inner corner termini of one set of said guide rails, one of said arcuate rails being disposed a distance above said belts greater than and the other being disposed a distance less than the distance that said rails are disposed above said belts, an arcuate outer rail disposed intermediate of and connected to the outer corner termini of the other set of said guide rails, said arcuate outer rail being disposed above said belts a predetermined height so that articles of a height greater than said predetermined height will be conveyed around the corner while articles less than said predetermined height will continue their travel upon said first belt, said belts being entrained about pulleys, and means supportingly journalling said pulleys in the depending sides of said support assembly sections.

8. A system for conveying articles around a corner comprising first and second endless belts having adjacent ends disposed in close proximity and substantially at right angles to each other to define a corner, each belt having an upper flight and a lower flight, a support assembly, said support assembly having sections disposed in angular relationship, each section being of a generally inverted U-shaped configuration including a base and depending sides, each base being a honeycomb structure having a laminated upper exterior base surface, the upper flights of said first and second belts being adapted to support and convey articles, the upper flights of each belt being in contact with and supported by an associated one of said laminated upper exterior base surfaces, a guide assembly including spaced parallel guide rails disposed on both sides of and above said first and second belts for maintaining the position of articles on said belts, said rails terminating at said corner, an arcuate rail connected to the outer corner termini of one set of guide rails, and said arcuate rail being disposed above said belts a predetermined height, a drive pulley engaged with each belt, the drive pulley of the second belt partially underlying the upper flight of said first belt, said pulleys being supportingly journalled in the depending sides of said support assembly sections, and means for driving said drive pulleys whereby articles traveling in a first direction on said first belt are directed by said guide assembly to said second belt whereupon said articles assume a second direction of travel at right angles to said first direction of travel.

9. A system for conveying articles about a corner comprising first and second endless belts having adjacent ends disposed in close proximity and in angular relation to each other, each belt having an upper flight and a lower flight, a support assembly, the upper flights of each belt being in contact with and supported by said support assembly, said support assembly comprising a plurality of elongated sections two of which are disposed in the same angular relation to each other as are said belts, each of said sections being adapted to be connected with another like section so as to form a continuous conveying system of unlimited length in both directions from said corner, each section including a base element with sides dependent therefrom, said base element forming a web between said sides and being constructed of a laminate of resin impregnated fiber glass cloth on both sides of a honeycomb structure, said sides being of flange-like appearance and formed by the continuation of said laminates of resin impregnated fiber glass cloth normal to said web, the upper flight of each belt being in contact with and supported by the base portions of said support assembly, a guide assembly mounted above said support assembly, the upper flights of said belts being disposed at the same level, a drive pulley engaged with each belt, the drive pulley of the second belt partially underlying the upper flight of said first belt, means journalling said pulleys in the dependent sides of said sections, and means for driving said drive pulleys whereby articles traveling in a first direction on said first belt are diverted by said guide assembly to said second belt whereupon said articles assume a second direction of travel at an angle to said first direction of travel.

10. A system for conveying articles about a corner comprising first and second endless belts having adjacent ends disposed in close proximity and substantially at right angles to each other to define a corner, each belt having an upper flight and a lower flight, a support assembly, the upper flights of each belt being in contact with and supported by said support assembly, said support assembly comprising a plurality of elongated sections two of which are disposed at substantially right angles to each other, each of said sections being adapted to be connected with another like section so as to form a continuous conveying system of unlimited length in either direction from said corner, each section having a base element with sides dependent therefrom, said base element forming a web between said sides and being constructed of a laminate of resin impregnated fiber glass cloth on either side of a honeycomb structure, said sides being of flange-like appearance and formed by the continuation of said laminates of resin impregnated fiber glass cloth normal to said web, the upper flight of each belt being in contact with and supported by the base portions of said support assembly, a guide assembly mounted above said support assembly, said guide assembly including parallel spaced rails disposed on both sides of said first and second belts for maintaining the position of articles on said belts, said rails terminating at said corner, a flexible and arcuate rail connected to the outer corner termini of one set of guide rails, said arcuate rail being disposed a predetermined height above said belts, the upper flights of said belts being disposed at the same level, a drive pulley and an idler pulley engaged with each belt, means journalling said pulleys in the dependent sides of said sections, each idler pulley being supported by a different section of said support assembly, the drive pulley of said second belt partially underlying the upper flight of said first belt, and means for simultaneously driving said drive pulleys whereby articles of a height greater than said predetermined height traveling in a first direction on said first belt are diverted by said guide assembly to said second belt.

11. An elongated belt supporting structure of inverted U-shaped cross section for use with an article conveying system comprising a base element with sides dependent therefrom, said base element including a honeycomb member, first laminated layers of resin impregnated fiber glass cloth directly overlying the upper surface of said honeycomb member and extending over and past the sides thereof partially in a direction generally normal to the base so as to form downwardly extending flanges therefrom, second laminated layers of resin impregnated fiber glass cloth directly underlying said honeycomb structure, an elongated reinforcing strip running the length of said supporting structure on each side thereof, one side of each of said strips being in contact with said second layers directly therebeneath, a second side each of said strips being in contact with said downwardly extending flanges, and third laminated layers of resin impregnated fiber glass cloth in contact with and directly underlying portions of said second layers, said third layers further contacting and overlying the third side of each of said elongated strips, said third layers also being joined to said flanges.

12. The structure of claim 11 wherein loose glass fibers are utilized as reinforcement for each of said laminated layers of resin impregnated fiber glass cloth.

13. The structure of claim 11 wherein said reinforcing strips are triangular in transverse section and are formed of wood.

14. In a conveyor system of the type including a plurality of endless belts arranged in end-to-end relationship, each belt being entrained about first and second spaced pulleys journalled to adjacent conveyor sections, the first pulley of one of said belts being spaced from the second pulley of another of said belts to define a gap therebetween, the improvement comprising means for securing together said adjacent conveyor sections and means for spanning the gap between said first and second pulleys, said spanning means comprising an inverted substantially U-shaped plate having a base disposed substantially tangentially to the peripheries of the first and second pulleys and depending flanges secured to the adjacent conveyor sections, said securing means comprising a substantially U-shaped plate having a base and upstanding members on opposite sides of said base, and means adjustably connecting each of said members to each of the adjacent conveyor sections.

15. The conveyor system as defined in claim 14 wherein each of said adjacent conveyor sections further carries a pair of tensioning rollers adjacent one of said first and second pulleys, and means for adjustably positioning each of said rollers with respect to each other for varying the tautness of said belts.

16. The conveyor system as defined in claim 14 wherein adjacent ones of the first and second pulleys includes shafts supported for rotation by the adjacent conveyor sections, a pulley carried by each of said shafts, and a belt entrained between each last mentioned pulley whereby rotary movement of the first pulleys is imparted to the second pulleys.

17. A conveyor belt supporting section comprising a base element with opposed sides projecting therefrom, said base element being constructed of a laminate of resin impregnated fiber glass cloth on both sides of a honeycomb structure, said sides being formed by a continuation of said laminate resin impregnated fiber glass cloth, and said opposed sides including means for supporting conveyor elements of a conveyor system.

References Cited by the Examiner

UNITED STATES PATENTS

| | | | |
|---|---|---|---|
| 1,109,284 | 9/1914 | Friel | 198—38 |
| 2,346,285 | 4/1944 | Beaulieu et al. | 198—38 |
| 2,477,852 | 8/1949 | Bacon. | |
| 2,536,961 | 1/1951 | Smith | 198—102 X |
| 2,563,427 | 8/1951 | Scott | 198—102 |
| 2,569,711 | 10/1951 | Foster | 198—102 X |
| 2,576,073 | 11/1951 | Kropa et al. | |
| 2,583,471 | 1/1952 | Collis | 198—102 X |
| 2,600,038 | 6/1952 | Whaley | 198—38 |
| 2,638,204 | 5/1953 | Collis | 198—102 |
| 2,701,638 | 2/1955 | Petro | 209—90 |
| 2,794,756 | 6/1957 | Leverenz. | |
| 2,823,460 | 2/1958 | Weiler. | |
| 2,866,538 | 12/1958 | Goldberg | 198—189 |
| 3,127,006 | 1/1964 | Tochtermann et al. | 198—189 X |

FOREIGN PATENTS 703,184  2/1931  France.

SAMUEL F. COLEMAN, *Primary Examiner.*

WILLIAM B. LA BORDE, *Examiner.*